May 24, 1938.                F. NOACK                2,118,519
                             COLOR FILM
                         Filed March 19, 1936
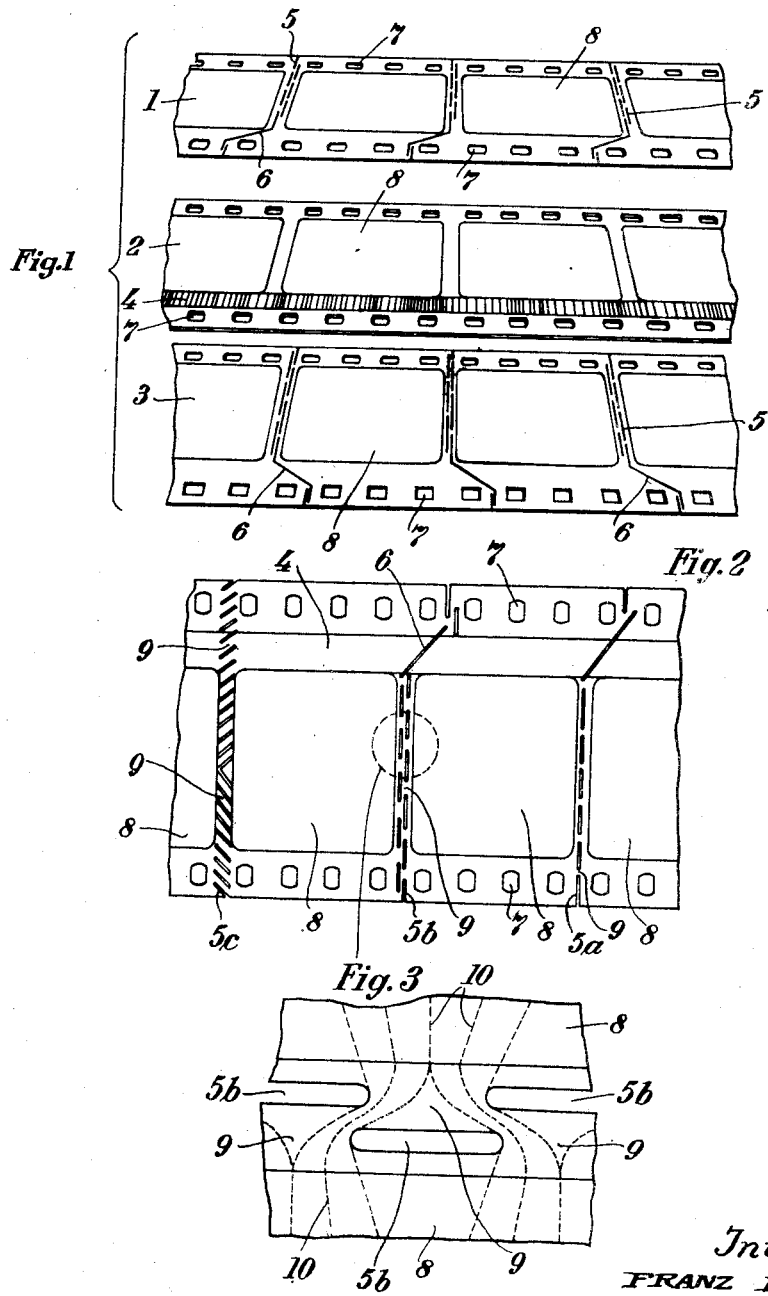
Inventor:
FRANZ NOACK
By
Attorney:

Patented May 24, 1938

2,118,519

UNITED STATES PATENT OFFICE 2,118,519

COLOR FILM

Franz Noack, Berlin, Germany

Application March 19, 1936, Serial No. 69,615
In Germany November 16, 1933

7 Claims. (Cl. 88—16.4)

This invention relates to films which are so prepared to facilitate the accurate superposing of several film strips such as required in the production of color films.

In producing subtractive color films, two or more monochromatic partial images or monochromatic film strips are superposed and so united to a single film strip that the latter can be cinematographically projected in the normal way. Many known processes are using this principle of uniting several monochromatic films either by cementing together or by printing several monochromatic partial images on a common film strip, such as by an imbibition process. A serious difficulty in these processes is due to the non-uniform shrinking of the partial films, causing imperfect co-incidence of the partial images.

In order to compensate such non-uniform shrinking, the single film strips have been treated or impregnated with a material adapted to remove the shrinking temporarily, or a film having twice or three times the width of the normal film is subjected to a wet and dry treatment to obtain uniform shrinking and then longitudinally cut into the single strips which have to be immediately joined with each other in order to prevent further shrinking.

In both cases the manufacture is complicated and expensive due to the additional apparatus required. In case of films of double or threefold width the satisfactory dyeing of the monochromatic film strips is rendered very difficult and requires further special devices.

While in case of cementing the films together the films must have absolutely uniform shrinking over their entire length in order that the partial pictures strictly coincide and are in exact registry with each other, in the imbibition processes in which the partial color pictures are successively transferred from printing films to a ground-film by way of imbibition, non-uniform shrinking or elongation is usually avoided by mechanically elongating and forcing the shorter film or both films to a common specific length during the imbibition process and while the two films are in contact with each other over a more or less large distance, thus to secure exact registry of the partial images. It is obvious that the films are excessively stressed thereby, so that the perforations may be torn and the registry impaired after a short use of the printing films.

It is the object of this invention to avoid these drawbacks and to provide a film construction adapted to facilitate longitudinal elongation or contraction of at least one of the partial films so as to adapt the film or films to the length of a ground film which may be an ordinary film strip.

According to the invention, the film to be cemented on to another film or in case of an imbibition process the printing film is divided or separated into the single images or into groups of partly or completely cohering image frames. The division is effected by small slits, openings or incisions arranged transversely across the film strip. The slits between adjacent image frames preferably consist of two linear cuts or perforations. The punching of the slits or perforations overlapping each other in such a manner that any geometrical line drawn in the longitudinal direction of the film strip intersects at least one of the slits, therefore facilitating longitudinal deformations of the individual film portions and enabling the attainment of complete registry of two or more film strips substantially independently of differences in the shrinking of the separate film strips is effected after the film strips have been subjected to the wet-, dry- and dyeing process shortly prior to the cementing or to the imbibition process.

By this expedient the film is rendered elastic so that it can be elongated or contracted within the limits required for compensating its shrinking or expansion. In this manner it is possible to adapt any desired length of a film punched or perforated according to the invention to any other non-perforated film in spite of non-uniform length due to shrinking or expansion, and to secure perfect coincidence or registry of the standard longitudinal driving perforations serving for the transport of the film in a camera or projector and of the partial pictures or images without undue stresses and wear.

In the practice of my invention several methods can be applied. For example, if a three-color film is to be produced by cementing together several monochromatic component film strips, the component films may be produced in a simple manner and without paying regard to shrinking and without the necessity of using a film strip of multiple width or special preparation to prevent shrinking of the component film strips. If three monochromatic films are used, two of them are transversely slotted and cemented on to the third film, which may be without slits or perforations. For causing the monochromatic images to coincide with each other, the longitudinal perforations are run over common sprockets the teeth of which engage and tightly fit into the superposed perforation holes. In cementing the three films together, the film without the transverse slits forms the base whereby the two slitted films will adapt themselves to the length of the ground film either by contracion or by elongation. Due to the fact that no excessive stress or tension exists in the cemented films, the single films may be of different thickness in such a manner that very thin complementary films may be cemented on to a stronger ground film. By this step the elasticity is augmented and in addition the tendency of films to separate is eliminated.

In case of an imbibition process according to the invention the printing films are preferably provided with slits according to the invention. It is thus rendered possible to bring the printing films simultaneously into contact with the ground film to be printed at any desired distance. This is important because by using a longer contact distance which is equivalent to a longer imbibition time the dyeing or printing will proceed more satisfactorily and uniformly and the running speed of the film can be increased accordingly.

The accurate coincidence of the partial monochromatic images may be secured by adjusting pins, such as in the form of toothed chains which are running with the film strips, in any suitable manner.

Further objects and particulars of the invention will be apparent from the following detailed description taken in connection with the annexed drawing showing some exemplifications of the invention and in which:

Figure 1 is a view of three film strips, to be superposed, two of which are constructed in accordance with the invention.

Figure 2 is a partial view on an enlarged scale of a film strip of Figure 1, showing the construction in accordance with the invention.

Figure 3 is a fractional part view of Figure 2 drawn on still larger scale.

Referring to the drawing, Figure 1, items 1, 2 and 3 are the three film strips to be superposed, the film 2 being the ground or base film which is produced without paying any regard to shrinking and which may bear a photographic sound record shown at 4. The film strips 1 and 3 are likewise produced without paying regard to shrinking, but are provided with cuts or incisions 5. Within the range of the sound record the cuts run at an oblique angle as shown at 6 to avoid crack noises in the sound reproducer. The direction of the cuts 6 should preferably be about 45° to the longitudinal axis of the film strip. In case of two complementary strips 1 and 3, as shown in the drawing, the angular cut 6 of one film strip (1) should preferably run in a direction opposite to that of the other film strip (3), so as to avoid additive effects of the two corresponding cuts in respect of the reproduction of the sounds in the reproducing device.

In one form of the invention the film strips 1, 2 and 3 are monochromatic films each of which is dyed or colored in another ground or fundamental color such as red, yellow, and blue. The complementary films 1 and 3 which preferably are very thin, are cemented on to both sides of the ground film 2, which may be thicker and is not slotted as shown. In case of a bi-chromatic film, one of the strips 1 or 3 is omitted.

For cementing the strips, any suitable adhesive substance may be used. When cementing the strips 1, 2 and 3, the single partial photographs or pictures 8 are caused to coincide by the aid of adjusting pins engaging the perforations 7 serving for the film transport in a known manner whereby the complementary strips 1 and 3 are accurately adapted to and brought into registry with the ground film notwithstanding non-uniform shrinking, due to the elasticity effected by the cuts or incisions 5 and 6 provided in accordance with the invention.

In another form of the invention, the strip 2 may be the imbibing ground film in an imbibition process. It may be of normal thickness and carries the sound record 4 in normal manner. The film strip 1 in this case is a printing film and slotted or perforated in accordance with the invention. In the printing process the printing film will thus adapt itself to the ground film with a contact distance of e. g. 8 m. without any stress on the ground film and without undue stress on the printing film. Adjusting pins or teeth which are not rigidly interconnected engaging the perforations 7, may serve to effect accurate coincidence of the corresponding images 8.

Practical forms of the transverse cuts, incisions or perforations are shown in Figure 2. The form on the right shows interrupted cuts or incisions 5a with or without the film material being stamped out, leaving small bridge portions 9 between the cuts 5a.

In the middle form, two lines of interrupted cuts 5b are arranged in such manner as to overlap each other whereby any geometrical line in the longitudinal direction of the film intersects at least with one of the cuts, thereby affording increased elasticity of the separate image portions. In the third form, oblique cuts 5c are provided which likewise overlap each other in the longitudinal projection and provide similar advantages as to overlapping cuts 5b. In order to prevent lateral displacement of the two adjacent film portions due to the oblique form of the cuts, the latter are arranged symmetrically with reverse inclination as shown. In this case the angular cuts 6 for passing the sound record may be dispensed with as will be readily understood.

A fraction of Figure 2 is shown on a still further magnified scale in Figure 3. The overlapping cuts 5b are arranged in the free space between the two images 8. The end portions of the slits 5b are of circular or rounded form to prevent tearing at these points due to indenting effects. The lines of tensile stress acting in longitudinal direction of the film strip are indicated by the dotted lines. It will be seen that portions of increased stress are resulting at 10 between the overlapping slits 5b, causing deformation and distortion of these portions resulting in an elongation or shortening of the whole film strip. A similar effect will occur at 9 between the cuts 5a, however, the deformation there will be restricted to linear stretching of the small bridge portions 9 while in case of the cuts 5b, bending and distortion of the portions 10 will occur, thus requiring for a given amount of elongation or shortening a smaller total stress and smaller specific stresses per unit of film cross-section, so that the danger of tearing is reduced and the elasticity increased. Favorable results wil be obtained by so arranging the slits that all of the longitudinal lines of tensile stress are interrupted or cut between each two images or periodically after a certain number of images in such manner that the mechanical coherence between the film portions so subdivided is not perfectly interrupted but maintained by small intermediate portions of film material remaining between the slits.

Other transverse incisions or slits may likewise be provided within the scope of this invention, to facilitate contraction and elongation of the film strip.

Due to its special features a film strip constructed in accordance with this invention may be used not only for color film but for any processes or methods necessitating a very accurate length of a film strip and compensation of shrinking or stretching. This problem may occur in producing films with a double role played by one person or in sound films to be superposed or in all such cases wherein at least two film strips are to be kept in accurate contact or registry over a longer distance.

I claim:—

1. A film strip adapted for being superimposed upon a similar film strip with accurate registry of the corresponding image frames and driving perforations of the strips, said strip having a plurality of slits with rounded ends in at least certain of the intervening portions between adjacent image frames, said slits being so disposed that any line drawn in the longitudinal direction of the film strip intersects at least one of the slits in each of the intervening portions to increase the elasticity thereof.

2. A component color film strip adapted for being superimposed upon a similar film strip with accurate registry of the corresponding image frames and driving perforations of the strips, said strip having a plurality of transverse slits in at least certain of the intervening portions between adjacent image frames, said slits being arranged in overlapping relation with each other so that any line drawn in the longitudinal direction of the film strip intersects at least one of the perforations in each of the intervening portions to increase the elasticity thereof.

3. A color film comprising three partial component film strips superimposed upon each other with complete registry of the corresponding image frames and driving perforations of the strips, the two outer strips having a plurality of perforations in at least certain of the intervening portions between adjacent image frames, said perforations being so disposed that any line drawn in the longitudinal direction of the film strips intersects at least one of the perforations in each of the intervening portions to increase the elasticity thereof.

4. A film strip adapted for being superimposed upon a similar film strip with accurate registry of the corresponding image frames of the strips, said strip having a plurality of overlapping perforations in the intervening portions between adjacent image frames, said perforations being so disposed that any line drawn in the longitudinal direction of the film intersects at least one of the perforations in each of the intervening portions to increase the elasticity thereof.

5. A film strip adapted for being superimposed upon a similar film strip with complete registry of the corresponding image frames of the strips, said strip having at least two rows of overlapping slit-like perforations arranged transverse to the strip and within at least certain of the intervening portions of the strip between adjacent image frames, whereby any line drawn in the longitudinal direction of the film strip intersects at least one of said perforations in each of the intervening portions to increase the elasticity thereof.

6. A film strip adapted for being superimposed upon a similar film strip with accurate registry of the corresponding image frames of the strips, said strip being provided with a plurality of parallel slit-like perforations arranged in at least certain of the intervening portions between adjacent image frames obliquely to the longitudinal dimension of the strip, whereby any line drawn in the longitudinal direction of the strip intersects at least one of said perforations in each intervening portion to increase the elasticity thereof.

7. A film strip adapted for being superimposed upon a similar film strip having a sound track alongside one edge thereof with accurate registry of corresponding image frames of the strips, said strip having slit-like perforations arranged in at least certain of the intervening portions between adjacent image frames, said perforations being transverse to the lengthwise dimension of said strip within the region of the adjacent image frames and crossing the space occupied by the sound track in the superimposed position of the strips in an oblique direction to the lengthwise dimension of the strip.

FRANZ NOACK.